United States Patent [19]

Armando et al.

[11] Patent Number: 4,539,211

[45] Date of Patent: Sep. 3, 1985

[54] PROCESS FOR MANUFACTURING CAVITY-FILLED CEREAL PIECES

[75] Inventors: Toni E. Armando, Cary; John R. Brewer, Barrington; Leroy F. Duvall, Crystal Lake; John C. Novotny, Hebron, all of Ill.

[73] Assignee: The Quaker Oats Company, Chicago, Ill.

[21] Appl. No.: 522,428

[22] Filed: Aug. 11, 1983

[51] Int. Cl.$^3$ ............................ A23L 1/10; A23L 1/164
[52] U.S. Cl. ..................................... 426/291; 426/295; 426/89; 426/93; 426/94; 426/96; 426/103; 426/660
[58] Field of Search ............... 426/94, 96, 103, 104, 426/282, 283, 284, 285, 289, 291, 293–295, 302, 303, 305, 559, 560, 619–621, 660, 512, 514, 808; D1/1–24, 27, 99; 427/230, 231, 242

[56] References Cited

U.S. PATENT DOCUMENTS

| | | | |
|---|---|---|---|
| 1,239,221 | 9/1917 | Rodman | 264/117 |
| 2,707,153 | 4/1955 | Beltman | 426/103 |
| 2,788,277 | 4/1957 | Huber | 426/96 |
| 3,480,445 | 11/1969 | Slaybaugh | 426/284 |
| 3,868,471 | 2/1975 | Decelles et al. | 426/303 |
| 4,038,427 | 7/1977 | Martin | 426/285 |

*Primary Examiner*—Raymond Jones
*Assistant Examiner*—Elizabeth A. King
*Attorney, Agent, or Firm*—Joseph P. O'Halloran

[57] ABSTRACT

A method is disclosed for manufacturing a filled composite product of bite-sized solid cereal-based pieces having a recess, and in which the recess has secured therein a multiplicity of smaller solid food pieces. The process involves (a) admixing the larger cereal-based pieces (having a substantial recess or cavity) with the smaller solid particulate ingredients in a revolving vessel, (b) contacting the admixture with a limited quantity of a low viscosity non-tacky liquid of sufficient quantity to slideably adhere the smaller pieces to the larger pieces, (c) rotating the drum, and then (d) drying the resulting filled composite pieces.

8 Claims, 5 Drawing Figures

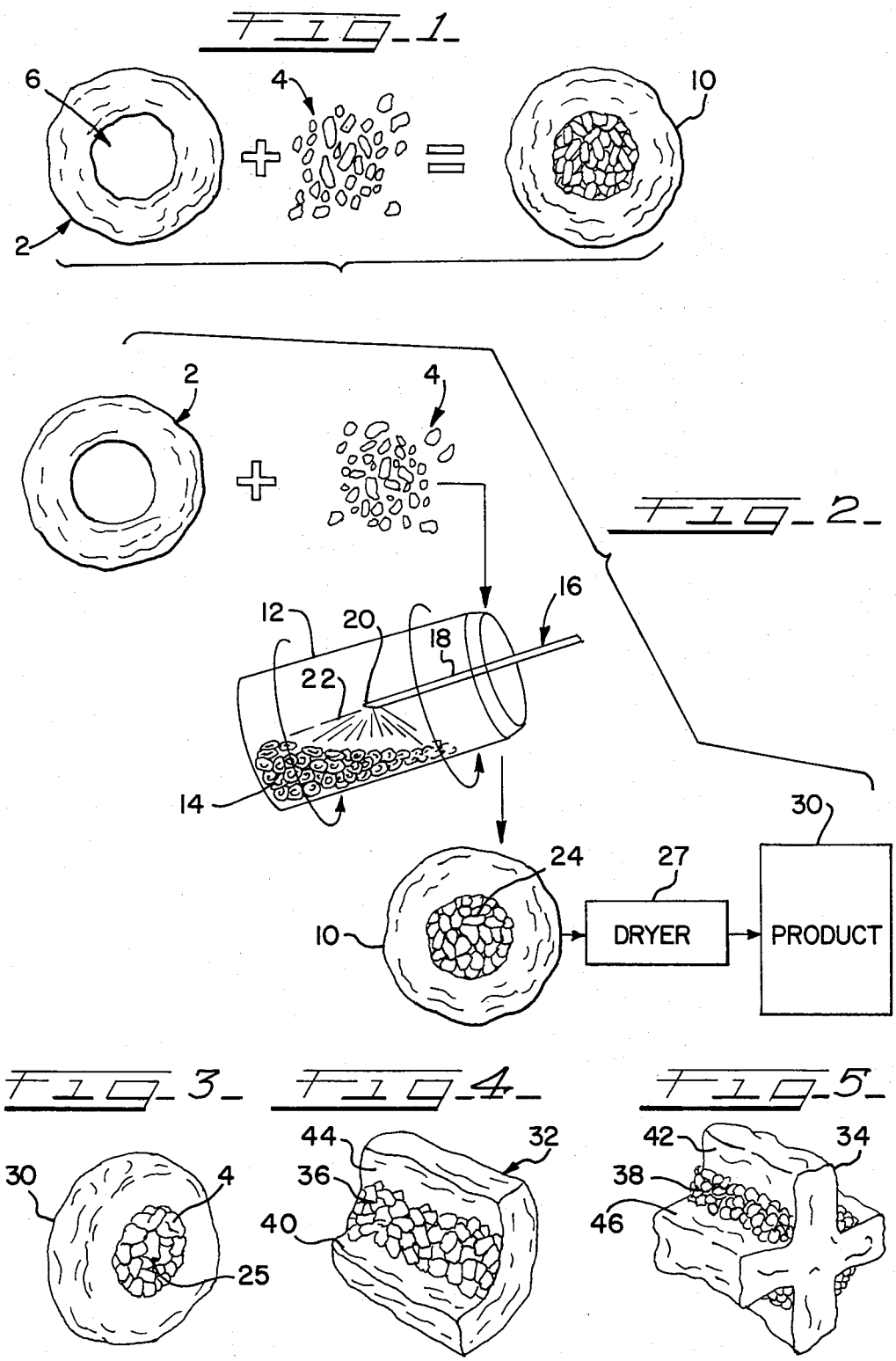

PROCESS FOR MANUFACTURING CAVITY-FILLED CEREAL PIECES

BACKGROUND OF THE INVENTION

"Centerfilling" produces products which have a dual character. They have an "outer" portion which is encountered first as the consumer bites down on the product. The consumer then encounters an "inner" portion which may be of a similar character to the outside portion, or may be totally different. Centerfilled products normally include, for example, jellies, gums, fruits, nuts, grain pieces, and the like.

We have found no teaching in the literature regarding the centerfilling of larger, solid, cavity containing pieces such as cereal-based solid pieces with other smaller solid pieces such as, fruits, nuts, and the like, in a high-speed industrial process. We have found no high-speed process for the filling of cavities, generally speaking, in such cereal-based solid pieces with such other smaller solid pieces.

Typically, cereal pieces have been centerfilled with liquid are extruded during cooking extrusion of the cereal in co-extrusion processes, in both human foods and pet foods manufacture. (See Benson U.S. Pat. No. 3,482,992).

Also, the literature is replete with the teachings of the use of enrobers such as industrial revolving drum enrobers, to produce "centerfilled" products such as candies, and the like. In such processes, solid "centers" are sprayed with a liquid coating capable of bein9 dried into a solid outer shell. thus enlarging the diameter of the pieces comprising the initial bed. The respective pieces initially charged to the enrober becomes the "centerfill" and the sprayed liquid becomes the hard, solid, outer coating of the resulting product piece.

We have discovered a process by which solid pieces such as solid cereal-based pieces can be "centerfilled" with smaller discrete supplemental solid pieces almost instantly in a revolving vessel such as an enrober. We have also discovered a unique class of cereal-based products in which solid cereal base pieces have a configuration with recessed portions, and in which the recessed portions are filled with smaller pieces of other solid ingredients. The process in accordance with the present invention achieves virtually instantaneous concentration, positioning, and bonding of the smaller solid ingredient pieces in the cavity or recess portions of the larger base materials. In addition, in preferred embodiments, the resulting open porosity of the mass of small pieces provides a network of interstitial voids into which supplemental flavorant coatings tend to be concentrated due to capillary action. These assembled composite pieces are then dried prior to packaging. Such products have a crisp outer cereal portion which is first encountered by the consumer, as he or she bites down, and a chewy flavorsome inner portion which is subsequently experienced.

OBJECTS OF THE INVENTION

It is an object of this invention to provide a new class of edible products comprising larger solid pieces having cavities or recesses, and smaller solid pieces bonded within the cavities or recesses of the larger pieces and none of the smaller pieces being bonded to the non-cavity or non-recess portions of the larger pieces.

Thus, it is an object of the invention to provide a new class of composite cereal products, comprising cereal-based pieces having cavities and solid centerfill pieces bonded in the cavities portions of the cereal-based pieces.

It is further object of the invention to provide a method in which solid pieces of dried fruits, nuts, pieces of grain cereal, cereal grains, pieces of cereal-based solids, and the like, can be concentrated in relatively interior regions of cavities in or on various cereal-based pieces of a wide multiplicity of cavity-containing configurations.

It is another object of a preferred embodiment that such products have a crisp outer cereal portion which is first encountered by the consumer, as he or she bites down, and a chewy flavorsome inner portion which is subsequently experienced.

It is a further object of the present invention to provide a process for the manufacture of such pieces, which process is extremely simple and streamlined, and which requires minimal equipment residence time and uses conventional equipment.

It is a further object of the present invention that the process by which these and other objects are achieved be a high-speed economical process having relatively low energy requirements, and being amenable to either batch or continuous operations.

It is a further object of the present invention that the types of equipment by which the centerfilling method of this invention is practiced have relatively low capital financial requirements.

SUMMARY OF THE INVENTION

These and other objects which will be apparent hereinafter are all achieved in accordance with the invention which is disclosed hereinafter. In the following description, drawings will be referred to, and preferred embodiments will be disclosed, but it is to be understood that the exemplary disclosure is not to be interpreted as being unduly restrictive, but merely illustrative of the invention claimed hereinafter.

In accordance with a preferred embodiment of the present invention, relatively small solid pieces of auxiliary ingredients are admixed with, concentrated within, and physically bonded to the walls of recesses within the outer perimeters of, a shaped larger cereal dough derived piece having a configuration including a substantial recess or cavity. In accordance with the present invention, the filling with the auxiliary ingredient solid smaller pieces occurs within the larger solids in a revolving vessel, such as a revolving enrober.

The process comprises admixing a plurality of larger cereal dough-derived pieces and a quantity of smaller pieces of an auxiliary ingredient, in a rotatable vessel to form a moving or tumbling bed of mixed solid ingredients therein; and rotating the vessel while contacting the bed with a limited quantity of a low viscosity, non-tacky syrup. The contacting is achieved, for example, by spraying or otherwise admixing the syrup with the tumbling bed of the comingled mass of solids. The syrup comprises a relatively low viscosity liquid which is capable of being dried to a condition in which it permanently bonds the smaller pieces to the larger pieces.

The ratio of cereal-based pieces and smaller pieces can be so controlled that the texture of inner filling ranges from quite chewy to slightly chewy. The amount of smaller pieces inherently affects the amount of syrup retained and "dried" in the filled recesses. The chewy character is thus complex. However, the quantity of smaller pieces, in accordance with this invention is restricted or limited to that quantity which will not exceed substantially the capacity of the recesses or cavities to hold said smaller pieces.

The preferred large dough-derived pieces which are filled in accordance with this invention are preferably bite-sized, for example with a largest dimension being between ¼ and 1¼ inches inclusive. Also, the recess or cavity is relatively large, preferably having an opening which has a dimension at least 25% of the largest dimension of the larger piece itself. The larger pieces must be of sufficient strength as to maintain their structural integrity during tumbling in the bed during rotating of the vessel in accordance with this invention.

The process is preferably sequenced so that the liquid contacts the cereal-based pieces prior to the addition of the smaller pieces. This is to eliminate the agglomeration of smaller pieces to each other prior to contact with the larger pieces and thus ensure even quicker migration of smaller pieces into the cavities or recesses of the larger cereal-based pieces Thus, in accordance with the present invention the relatively low viscosity non-tacky liquid causes the smaller pieces to loosely adhere to the larger pieces by a liquid surface tension bond which allows the smaller pieces on the exposed exterior surfaces of the larger piece to slide along that surface during drum rotation and be relocated on the larger piece surface, for example, until it is bonded with this relatively moveable liquid bond in a "sheltered" location within a recess or cavity within the larger piece's perimeter. The smaller pieces, now shifted to the sheltered or protected recess location, can no longer contact the adjacent larger pieces during tumbling and therefore remain accumulated in such recesses, in accordance with this invention.

Thus, by "non-tacky" is meant that the liquid at temperature during tumbling, will slideably adhere the smaller pieces to the larger pieces.

We were astounded on our first discovery of this process to observe that the smaller pieces were virtually instantly concentrated within the sheltered recesses of the larger pieces in accordance with the process of the present invention, and that substantially none of the smaller pieces adhered to the external exposed surfaces, i.e. non-recess surfaces, of the larger pieces. This was particularly unexpected since the result was just the opposite of that normally achieved in equipment called "enrobers." The smaller pieces become permanently bonded in the recess locations as the adhering liquid solution is evaporated during drying. When the resulting assembled composite pieces were dried in a conventional manner the weak, moveable, liquid surface tension bonds became permanent, substantially solid, immovable bonds, and the composite pieces then consist of the larger pieces having a multiplicity of the smaller pieces confined within the recess portions of the larger pieces and permanently bonded therein.

In the attached drawings,

FIG. 1 is a schematic, illustrating the solid ingredients and product resulting therefrom.

FIG. 2 is a schematic, illustrated flow diagram summarizing a process for the production of a composite product piece in accordance with the present invention.

FIGS. 3, 4, and 5 are perspective views of preferred composite product pieces produced in accordance with the present invention.

In the preferred embodiments of the present invention illustrated in FIGS. 1, 2 and 3, an expanded cereal-based piece 2 having the configuration of a toroid, or bite sized doughnut, is admixed with a quantity of smaller solid pieces 4, of diced nuts, fruit pieces, cereal grains, such as rolled oat grain pieces, or the like, to provide a concentrating, and bonding of the smaller pieces within the central recess 6 of toroidal piece 2 to provide intermediate product 10 in which smaller pieces are concentrated within the recess 6 of the toroidal piece 2.

In FIG. 2, the schematic diagram represents the overall process in greater detail, and shows that, in accordance with a preferred embodiment of this invention, a multiplicity of expanded toroidal cereal pieces 2 and smaller pieces 4 of auxiliary material is charged to a revolvable vessel 12 with the result that the mixture of cereal pieces 2 and auxiliary pieces 4 constitutes a bed 14 within vessel 12. It is noted that vessel 12, in the illustrated embodiment, is slightly elongated and is shown to be revolvable around its longitudinal axis. The dimensional relationships are not critical. Liquid spraying means, generally indicated by the number 16, includes a lance portion 18 with nozzle means 20 at the end thereof for applying a spray pattern 22 over bed 14. Rotation of vessel 12 while spraying bed 14 results in virtually instantaneously transportation to, concentration of and bonding of the smaller supplementary solid pieces 4 in the recess portions 6 of substantially all of the larger cereal-based pieces 2. By providing just enough quantity of the smaller pieces to fill the recesses, or by providing less than enough smaller pieces to fill the recesses, the exposed "unprotected" non-recess surfaces of the larger pieces is substantially completly "wiped clean" of the smaller pieces during the drum rotation. When the word "filled" is used, herein, it is not intended to mean that the recesses must be "filled" to capacity, only that the the smaller pieces are placed or concentrated into the cavities or recesses. Within a few moments, the spraying is discontinued, and lance 18 can be withdrawn from the vessel to allow the tipping of the vessel downwardly to discharge bed 14. By the time of the discharge the bed consists almost entirely of filled pieces 10. Alternately, a flow-through or continuous enrober can be used for the same purpose. This conventional type of enrober may have openings on both ends.

Pieces 10, to which the auxiliary pieces 24 are moveably bonded are then heat treated, or dried to convert the liquid moveable bonds to substantially solid, immoveable bonds.

The intermediate product 10 is alternatively dried either during residence in the drum, during discharge therefrom and/or immediately after discharge from the revolving vessel or with any combination of these drying steps. The intermediate product piece 10 thus may be treated in a conventional dryer 27, or otherwise, to dry the low viscosity liquid coating into a permanently bonding condition by simply lowering the moisture content of the coating to produce the product 30. The syrup and solids are dried during the drying step, to moisture levels such that, when equilibrium is reached during closed storage, between the moisture level of the syrup and the moisture level of the cereal-based pieces, the cereal-based pieces have a moisture level which is in the storage stable range, preferably less than 10%, more preferably less than 5%. Under these conditions the formerly fluid columns and films connecting and cooling the respective solid pieces are transformed into solid bonding columns and films rigidly maintaining the smaller pieces in a fixed position.

FIG. 3 shows a perspective view of a final product 30 which is substantially identical in configuration to temporarily bonded composite piece 10 except that the mass 25 of particles 4 within the recess 6 of piece 2 is now permanently bonded in location, and the color is typically a toasted golden color.

The invention is not limited to the use of toroidal pieces of cereal-base, but is useful for pieces of cereal-base having any configuration which includes a substantial recess or cavity within its external perimeter.

FIGS. 4 and 5 illustrate two of such alternative products which can be produced in accordance with the method of the present invention. Cereal-based pieces 32 and 34 have masses 36 and 38, of smaller solid pieces respectively, concentrated and bonded to walls 40, 42, respectively, which define the recess regions 44, 46, respectively, of pieces 32, 34. Thus, if one were to lay pieces 32, 34, respectively, on a plane (not shown) the region between the plane and walls 40, 42 would define a recess or cavity regions 44, 46, even though the recess regions 44, 46 are not entirely surrounded by the cereal-based pieces 32, 34.

Cereal-based pieces 2, 32, 34 are preferably segments of an elongated dough extrudate (not shown because conventional) produced in conventional cooker extrusion methods. The cereal dough-derived pieces 2, 32, 34 can be expanded cereal pieces, for example, having a multiplicity of tiny surface pores, irregularities, or opened bubbles produced during expansion, and the like. Expanded cereal-base pieces are preferred inasmuch as the irregular surface and open pores and bubbles allow the syrup to concentrate therein, providing a desirable flavor and texture character, and provide improved bowl life in milk when so coated. It is to be understood that, in accordance with the present invention, most of pieces 4 are substantially larger in dimension than the dimensions of such surface irregularities and open bubbles, and the like encountered in expanded cereal pieces generally. The present invention is directed to the filling with pieces which are generally too large to be contained in the tiny open bubbles or pores on the expanded cereal surface. Pieces having dimensions up to approximately 60 percent of the smallest dimension of the recess areas 6, 44 and 46 are preferred. Pieces 4 should be small enough to reside entirely within the recesses 6.

A preferred embodiment of the present invention is shown in the following example. All temperatures are expressed in degrees Fahrenheit. The example is provided to illustrate a preferred embodiment in accordance with the present invention, and is not to be interpreted as unduly or unreasonably restrictive of the claims appended hereto.

EXAMPLE

Approximately 7 parts of sugar, 10 parts of coconut oil, 5 parts of water, and 17 parts of 40 D.E. corn syrup and 11 parts of honey are admixed in a kettle and brought to a temperature in the range of 130°–150° F. Salt and flavoring can be added at this point as desired. This syrup has a viscosity of 400 cps at 130° F. The admixture is heated to approximately 175° F. and is held for use as a spray syrup in accordance with the illustrated method of the present invention.

To a conventional rotary enrober are added 23 parts of smaller ingredient pieces 4 comprising admixture of conventional commercial quick cooking rolled oats, and approximately 8 parts of diced salted peanuts. In addition, approximately 14 parts by weight of dry bite-size toroidal expanded cereal pieces having a bulk density of approximately 2.8 ounces per 100 cubic inches are added. The driving means (conventional and therefor not shown) are activated to rotate the enrober on its axis thus tumbling the bed within the enrober. A spray injection nozzle 16 is extended into the enrober vessel 12 and the syrup mixture prepared in accordance with this example is applied to the bed 14 by means of a spray 22. (In an alternative preferred embodiment, the larger pieces 2 are charged to the enrober 12, the enrober is rotated and the spray 22 is applied to the bed, and the smaller pieces 4 are then added to the bed.) The quantity of liquid sprayed onto the bed is sufficient to form a liquid film on the large and smaller pieces, to slideably adhere to smaller pieces to the larger pieces, but is not sufficient to provide free drainable liquid.

Almost instantly recesses 6 in substantially every piece 2 of toroidal cereal-base become filled with ingredient pieces 4. Substantially none of the smaller pieces of peanuts and rolled oats adhere to the surfaces of piece 2 outside of the recessed regions. The contents of the enrober are then discharged onto conveying means and are dried in a Spooner oven and heated at temperatures slightly above 350° F. for 10 minutes. The dried contents of the oven trays are discharged in a manner which breaks up separate small clumps of filled pieces 30. The cereal pieces 10 have now been dried to become pieces of dried product 30 in which the mass 24 of pieces 4 are firmly and permanently secured to the inner recessed walls of the toroidal pieces 2. In accordance with a preferred embodiment of the present invention the pieces 30 can subsequently be coated with other flavor adjuncts, for example, by repositioning the dried pieces 30 in an enrober and pouring or spraying other flavored syrups over the cereal mixtures to enrobe them with the flavor adjuncts e.g. peanut butter-oil mixtures. The thus enrobed and dried mixtures are cooled on a perforated cooling bed, and typically stored in foil lined cartons for eventual consumption by consumers.

The product in accordance with a preferred embodiment of the present invention consists of golden brown pieces having irregular surfaces with pieces of rolled oats and nuts adhering to the insides of the toroidal piece's recesses. Virtually all of the cereal pieces have the recesses substantially filled with the oat/nut mixture. The texture is that of a crisp tender cereal with a slightly chewy interior. Flavor can be adjusted as desired and a sweet-base peanutty flavor with a mild honey aftertaste is highly desirable, for example.

The liquid which is sprayed into the enrober is one consisting entirely of edible ingredients, and is of a relatively low viscosity. By low viscosity is meant that the syrup is sufficiently low to be sprayed, and sufficiently low that when the syrup, the cereal pieces 2 and the supplemental pieces 4 are admixed, the supplemental pieces 4 are slideably, i.e. temporarily, bonded to the exterior exposed surfaces of the cereal-based pieces 2 with the result that upon further tumbling, the small pieces 4 are immediately brushed or scraped across the exposed surface until it slides into the protected area of the recess, and are thus concentrated within the cavity regions 6, 44, 46. Preferred syrups are those having viscosity in the range up to 700 cps at 130° F., and most preferred viscosities are those having viscosities in the range of 300 to 600 cps at 130° F. The viscosity of the liquid is too high for use in accordance with this invention when clumping of smaller pieces occurs in the mass of the bed, or when the smaller pieces are not slideably bonded to the larger pieces at bed temperature. The viscosity is also too high when the small pieces 4 adhere to toroidal pieces 2 throughout its surface (exposed surfaces) and the toroidal pieces are bonded or clumped to each other to the extent that the bed 14 is no longer a flowable bed as enrober 12 is rotated.

The preferred liquid contains a major portion of an aqueous sugar solution. Edible vegetable oils can be used, also, as all or part of the liquid, provided the liquid is converted to a substantially solid condition upon heating.

The reference herein to a limited quantity of bonding liquid is intended to mean that the bonding liquid is provided in an amount sufficient to bond the smaller pieces to the larger pieces, but not in so great a quantity as to provide free excess, drainable liquid when the bed is dumped or allowed to stand.

It is to be understood, for example, that the drying step referred to can take place in any conventional method, for example, as on a continuous basis in a rotating bed, or batch-wise in trays with Spooner ovens and the like.

While we do not intend that the claims herein be limited to any particular theory of operation we believe this surprising result (of concentrating and positioning of the smaller pieces in the recesses of the larger pieces) takes place in several steps. When liquid is applied to the larger pieces or to the larger pieces included in a mixed bed of smaller pieces, in accordance with this invention, sufficient liquid is added to form liquid films on both larger and smaller pieces. Then when these larger and smaller pieces contact each other, the liquid films unite at the point of contact and a small arcuate column of liquid "connects" the solid pieces to each other. These menicus shaped surface tension bonds actually tend to resist separation of the smaller pieces from the larger pieces, i.e. to resist separation vectors substantially perpendicular to the face of the large piece. However, due to the low viscosity liquid nature of the liquid column connecting the smaller pieces to the larger pieces, the smaller pieces freely respond to "sliding" vectors which are parallel to the surface of the larger pieces. And thus the smaller pieces are easily moved across the surface of the larger pieces and into the safe-harbor recesses. We believe this phenomena of the liquid bond which has resistance to vertical separations while facilitating lateral movement, is particularly crucial at the moment the smaller piece is moved into the mouth of recess 6, i.e. is moved through the surface which constitutes the transition between the exposed surface and recess surfaces of the larger pieces. Rather than being pulled away, the smaller piece slides into the recess. We don't fully understand although the exact physics of the phenomena, there seems to be something about the concavity of the recess that results in the strength of the liquid surface tension bond holding the small piece to the recessed, concave surface, being greater than the liquid surface tension bond connecting the smaller piece being moved to the other larger piece moving it. Thus the smaller piece separates from the larger neighboring moving piece as it enters the recess of the first large piece. Furthermore, the smaller piece slides further into the recess when another small piece slides in and pushes it parallel to the surface. The smaller pieces in the recess add to the concavity encountered by the next smaller piece brought adjacent to it. Another unexpected phenomena which we have observed to occur, is the concentration or pulling of liquid film from the exterior surfaces of the larger pieces, into the cavities containing the smaller pieces. We believe this results in minimal bonding of the larger pieces to one another during the heating or drying step, even though the recess portion is "heavy" with liquid.

We claim:

1. A method for manufacturing a filled composite food product comprising the steps:
    (a) charging into a revolvable vessel larger and smaller food pieces, said larger pieces being dry solid pieces having external exposed surfaces and having substantial recess or cavities bounded by sheltered surfaces, and said smaller solid pieces being small enough to reside within said recesses or cavities, said larger and smaller pieces being of sufficient quantity as to form a bed in said vessel;
    (b) charging to said vessel a low viscosity non-tacky liquid of sufficient quantity to slideably adhere smaller pieces to larger pieces, said liquid containing a non-volatile bonding material, said quanity of liquid not being of sufficient quantity to provide free excess drainable liquid;
    (c) rotating the vessel to tumble said bed, thereby concentrating the smaller pieces in the recesses or cavities of the larger pieces, and then;
    (d) drying the resulting pieces to a sufficient low moisture level for said bonding material to immovably bond said smaller pieces to said sheltered surfaces.

2. The method of claim 1 in which the liquid is first admixed with the larger pieces prior to admixing of the smaller pieces therewith.

3. The method of claim 1 in which the relatively low viscosity liquid has a viscosity in the range of 300 to 600 cps at 130° F.

4. A method of claim 1 in which the larger pieces have the configuration of bite sized toroids.

5. The method of claim 1 in which the smaller solid pieces are members selected from the group diced nuts, dried fruit pieces, cereal grains, cereal grain pieces, and pieces of cereal-based solid particulate matter.

6. The method of claim 1 in which a major part of the liquid comprises an aqueous solution of sugars selected from the group sucrose, corn syrup solids, dextrose, honey, and a minor part of an edible oil.

7. The method of claim 1 in which the liquid is sprayed on the pieces in the vessel at a liquid temperature of about 175° F.

8. The method of claim 1 in which the smaller pieces have large dimensions which are up to 60% of the smallest dimension of the cavity in the larger pieces.

* * * * *